United States Patent

[11] 3,627,893

[72] Inventor Ernst Seeger
 Biberach/Riss, Germany
[21] Appl. No. 465
[22] Filed Jan. 2, 1970
[45] Patented Dec. 14, 1971
[73] Assignee Boehringer Indelheim G.m.b.H.
 Ingelheim am Rhine, Germany
 Continuation-in-part of application Ser. No.
 608,500, Jan. 11, 1967. This application
 Jan. 2, 1970, Ser. No. 465

[54] LAXATIVE COMPOSITIONS CONTAINING AN ACID ADDITION SALT OF BIS-(4-HYDROXY-PHENYL)-(QUINOLYL-2)-METHANE
2 Claims, No Drawings

[52] U.S. Cl. .................................................. 424/258,
260/289
[51] Int. Cl. .................................................. A61k 27/00
[50] Field of Search .......................................... 424/258

[56] References Cited
UNITED STATES PATENTS
2,753,351  7/1956  Kottler et al. ................. 424/258

Primary Examiner—Sam Rosen
Attorney—Hammond and Littell

ABSTRACT: Laxative compositions containing an acid addition salt of bis-(4-hydroxy-phenyl)-(quinolyl-2)-methane as the active ingredient, and a method of inducing bowel movements therewith in warm-blooded animals.

LAXATIVE COMPOSITIONS CONTAINING AN ACID ADDITION SALT OF BIS-(4-HYDROXY-PHENYL)-(QUINOLYL-2)-METHANE

This is a continuation-in-part of copending application Ser. No. 608,500, filed Jan. 11, 1967.

This invention relates to laxative compositions containing a stable, nontoxic, pharmacologically acceptable acid addition salt of bis-(4-hydroxy-phenyl)-(quinolyl-2)-methane as the active laxative ingredient, as well as to a method of inducing bowel movements therewith in warm-blooded animals.

BACKGROUND OF THE INVENTION

U.S. Pat. No. 2,753,351 discloses the free base bis-(4-hydroxy-phenyl)-(quinolyl-2)-methane and its laxative properties.

In freshly prepared condition, the free base is a colorless, crystalline substance. However, during prolonged storage the free base undergoes noticeable discoloration, which is apparently predicated by gradual changes in the molecular structure. Moreover, this undesirable discoloration is hastened and occurs very rapidly when the free base is contacted with a polar solvent, such as aqueous ethanol. Contact with polar solvents occurs, for instance, in the course of the preparation of pharmaceutical tablets comprising the free base as an active ingredient; that is, when the tablet composition is moistened and granulated as a customary preliminary step prior to compressing the composition into tablets.

Organic bases having useful pharmacodynamic properties are often not stable enough or insufficiently soluble in the free base form to be practically suitable for incorporation as an active ingredient into pharmaceutical compositions, such as tablets and the like. Therefore, it is a customary expedient in the pharmaceutical art to convert the free base into a nontoxic, pharmacologically acceptable acid addition thereof, which is in most instances a stable, soluble, crystalline substance having the same pharmacodynamic properties as the free base.

However, in the case of bis-(4-hydroxy-phenyl)-(quinolyl-2-methane this simple, well-known expedient of conversion into an acid addition salt appeared not to be a solution to the problem, because of what was known from the literature about acid addition salts of quinoline, quinaldine and pyridine formed with strong acids, such as hydrochloric acid, hydrobromic acid or sulfuric acid, namely that such salts are strongly hygroscopic and quickly undergo deliquescence upon contact with the air [see O. Eckstein, Berichte 39 (1906), pages 2136 and 2137; F. Kaufler and E. Kunz, Berichte 42 (1909), page 390; and Beilstein 20, Main Volume, pages 344–345 and 389–390].

OBJECTS OF THE INVENTION

It is an object of the present invention to provide pharmaceutical laxative compositions which contain bis-(4-hydroxy-phenyl)-(quinolyl-2)-methane in a form which will not undergo the aforementioned undesirable discoloration during prolonged storage period or upon contact with polar solvents while, at the same time, leaving the advantageous laxative properties unimpaired.

It is another object of the present invention to provide pharmaceutical laxative compositions containing a stable, nontoxic, pharmacologically acceptable acid addition salt of bis-(4-hydroxy-phenyl)-(quinolyl-2)-methane as the active ingredient.

Still other objects and advantages of the present invention will become apparent as the description thereof proceeds.

THE INVENTION

Notwithstanding the prior art teachings regarding the instability of acid addition salts of quinoline, quinaldine and pyridine formed with strong acids, I have discovered that the above objects are achieved by transforming the free base bis-(4-hydroxy-phenyl)-(quinolyl-2)-methane into a nontoxic, pharmacologically acceptable acid addition salt thereof with a strong inorganic or strong organic acid. This transformation may be accomplished pursuant to customary procedures, that is, by dissolving or suspending the free base in an inert liquid medium and acidifying the resulting solution or suspension with the desired strong inorganic or organic acid.

Examples of suitable and preferred strong inorganic and organic acids are hydrochloric acid, hydrobromic acid, sulfuric acid, phosphoric acid, methanesulfonic acid, p-toluene-sulfonic acid and benzene-sulfonic acid.

Examples of suitable inert liquid media are ketones, such as acetone, and alcohols, such as methanol and ethanol.

The following examples further illustrate the present invention and will enable others skilled in the art to understand it more completely. It should be understood, however, that the invention is not limited to the particular examples given below.

EXAMPLE 1

Preparation of the Hydrochloride of bis-(4-hydroxy-phenyl)-(quinolyl-2)-methane

Forty grams of bis-(4-hydroxy-phenyl)-(quinolyl-2)-methane were suspended in 200 cc. of acetone. Thereafter, while stirring and cooling the suspension, gaseous hydrogen chloride was introduced therein until saturation. The light yellow crystalline precipitate formed thereby was separated by vacuum filtration, and the filter cake was dried. Thirty-nine grams of bis-(4-hydroxy-phenyl)-(quinolyl-2)-methane hydrochloride, m.p. 205° C., were obtained. The same result was obtained when ethanol was used in place of acetone.

EXAMPLE 2

Using a procedure analogous to that described in example 1, the acid sulfate of bis-(4-hydroxy-phenyl)-(quinolyl-2)-methane, m.p. 238° C., was obtained from the free base and sulfuric acid.

EXAMPLE 3

Using a procedure analogous to that described in example 1, the methanesulfonate of bis-(4-hydroxy-phenyl)-(quinolyl-2)-methane, m.p. 224° C., was obtained from the free base and methanesulfonic acid.

EXAMPLE 4

Using a procedure analogous to that described in example 1, the p-toluenesulfonate of bis-(4-hydroxy-phenyl)- (quinolyl-2)-methane, m.p. 136° C., was obtained from the free base and p-toluenesulfonic acid.

EXAMPLE 5

Using a procedure analogous to that described in example 1, the benzenesulfonate of bis-(4-hydroxy-phenyl)-(quinolyl-2)-methane, m.p. 138° C., was obtained from the free base and benzenesulfonic acid.

EXAMPLE 6

Using a procedure analogous to that described in example 1, the hydrobromide of bis-(4-hydroxy-phenyl)-(quinolyl-2)-methane, m.p. 218° C., was obtained from the free base and hydrobromic acid.

EXAMPLE 7

Using a procedure analogous to that described in example 1, the acid phosphate of bis-(4-hydroxy-phenyl)-(quinolyl-2)-methane, m.p. 226° C., was obtained from the free base and phosphoric acid.

The nontoxic acid addition salts of bis-(4-hydroxy-phenyl)-(quinolyl-2)-methane with strong inorganic or organic acids exhibit laxative activity in warm-blooded animals, have very low acute toxicity values, do not discolor during prolonged storage and are resistant to discoloration when contacted with polar solvents, such as aqueous ethanol solutions. Moreover, they are substantially more gentle to the stomach than the free base, wherefor oral dosage unit tablets containing the same as an active ingredient do not need to be covered with enteric coatings and the like.

For pharmaceutical purposes, the salts according to the present invention are administered to warm-blooded animals perorally or rectally as active ingredients in customary dosage unit compositions, that is, compositions in dosage unit form consisting essentially of a preferably solid inert pharmaceutical carrier and one dosage unit of the active ingredient, such as tablets, coated pills, capsules, wafers, suppositories and the like. One dosage unit of the acid addition salt pursuant to the present invention is from 0.5 to 4.2 mg./kg. body weight.

The following examples illustrate a few dosage unit compositions according to the present invention comprising an acid addition salt of bis-(4-hydroxy-phenyl)-(quinolyl-2)-methane as an active ingredient. The parts are parts by weight unless otherwise specified.

EXAMPLE 8

Tablets

The tablet composition was compounded from the following ingredients:

| | |
|---|---|
| Bis-(4-hydroxy-phenyl)-(quinolyl-2)-methane hydrochloride | 40.0 parts |
| Lactose | 118.0 parts |
| Potato starch | 50.0 parts |
| Polyvinylpyrrolidone | 9.0 parts |
| Tartaric acid | 1.0 part |
| Magnesium stearate | 2.0 Parts |
| Total | 220.0 parts |

Compounding procedure:

The bis-hydroxyphenyl-quinolyl-methane salt was intimately admixed with the lactose and the potato starch, and the mixture was moistened with an ethanolic 15 percent solution of the polyvinyl pyrrolidone which also contained the tartaric acid. The moist mass was forced through a 1.5 mm.-mesh screen, and the moist granulate obtained thereby was dried at 45° C., and then again passed through the screen. The dry granulate was admixed with the magnesium stearate, and the mixture was compressed into 220 mg.-tablets. Each tablet contained 40 mg. of bis-hydroxyphenyl-quinolyl-methane salt and, when administered perorally to a warm-blooded animal of about 60 kg. body weight, produced very good laxative effects.

EXAMPLE 9

Suppositories

The suppository composition was compounded from the following ingredients:

| | |
|---|---|
| Bis-(4-hydroxy-phenyl)-(quinolyl-2)-methane methane hydrochloride | 150.0 parts |
| Cocoa butter | 1,550.0 parts |
| Total | 1,700.0 parts |

Compounding procedure:

The cocoa butter was melted and then cooled to about 37° C., the finely powdered bis-hydroxyphenyl-quinolyl-methane salt was stirred into it, and 1,700 mg.-portions of the mixture were poured into cooled suppository molds. Each suppository contained 150 mg. of the bis-hydroxyphenyl-quinolyl-methane salt and, when administered by the rectal route to a warm-blooded animal of about 60 kg. body weight, produced very good laxative effects.

EXAMPLE 10

Suspension

The suspension was compounded from the following ingredients:

| | |
|---|---|
| Bis-(4-hydroxy-phenyl)-(quinolyl-2)-methane hydrochloride | 0.4 parts |
| Colloidal silicic acid | 3.0 parts |
| Carboxymethyl cellulose | 0.5 parts |
| p-Hydroxybenzoic acid methyl ester | 0.03 parts |
| p-Hydroxybenzoic acid propyl ester | 0.07 parts |
| Essence of cocoa | 1.5 parts |
| Glycerin | 5.0 parts |
| Sugar | 32.0 parts |
| Distilled water | 72.5 parts |
| Total | 115.0 parts |

Compounding procedure:

The distilled water was heated to 80° C., and the p-hydroxybenzoic acid esters were dissolved therein. The colloidal silicic acid was suspended in the solution, and then a mixture of the carboxymethyl cellulose and the sugar was dissolved in the suspension. The mixture was cooled to room temperature, the finely powdered bis-hydroxyphenyl-quinolyl-methane salt was suspended therein, and finally the glycerin and the essence of cocoa were added. Five cubic centimeters of the finished suspension contained 20 mg. of the bis-hydroxy-phenyl-quinolyl-methane salt, and when administered perorally to a warm-blooded animal of about 60 kg. body weight, produced very good laxative effects.

Analogous results were obtained when any other nontoxic, pharmacologically acceptable acid addition salt of bis-(4-hydroxy-phenyl)-(quinolyl-2)-methane with a strong acid was substituted for the particular bis-hydroxylphenyl-quinolyl-methane salt in illustrative examples 8 to 10. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to those skilled in the art that the invention is not limited to these embodiments and that various changes and modifications may be made without departing from the spirit of the invention or the scope of the appended claims.

I claim:

1. A pharmaceutical laxative dosage unit composition consisting essentially of an inert pharmaceutical carrier and and effective laxative amount of a stable, nontoxic, pharmacologically acceptable acid addition salt of bis-(4-hydroxy-phenyl)-(quinolyl-2)-methane formed with a strong inorganic or organic acid selected from the group consisting of hydrochloric acid, hydrobromic acid, sulfuric acid, phosphoric acid, methanesulfonic acid, p-toluenesulfonic acid and benzenesulfonic acid.

2. The method of inducing bowl movements in a warm-blooded animal, which comprises orally or rectally administering to said animal an effective laxative amount of a stable, nontoxic, pharmacologically acceptable acid addition salt of bis-(4-hydroxy-phenyl)-(quinolyl-2)-methane formed with a strong inorganic or organic acid selected from the group consisting of hydrochloric acid, hydrobromic acid, sulfuric acid, phosphoric acid, methanesulfonic acid, p-toluenesulfonic acid and benzene sulfonic acid.

* * * * *